(12) United States Patent
Racz

(10) Patent No.: US 11,255,678 B2
(45) Date of Patent: Feb. 22, 2022

(54) CLASSIFYING ENTITIES IN DIGITAL MAPS USING DISCRETE NON-TRACE POSITIONING DATA

(71) Applicant: Microsoft Technology Licensing, LLC, Redmond, WA (US)

(72) Inventor: David L. Racz, Palo Alto, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 428 days.

(21) Appl. No.: 15/159,124

(22) Filed: May 19, 2016

(65) Prior Publication Data

US 2017/0336215 A1    Nov. 23, 2017

(51) Int. Cl.
| G06F 16/30 | (2019.01) |
| G01C 21/32 | (2006.01) |
| G06F 16/29 | (2019.01) |
| G01S 19/13 | (2010.01) |

(52) U.S. Cl.
CPC .............. *G01C 21/32* (2013.01); *G01S 19/13* (2013.01); *G06F 16/29* (2019.01)

(58) Field of Classification Search
CPC .......................... G06F 17/6218; G06F 16/1407
USPC ........ 707/609, 687, 705, 769, 790, 813, 821
See application file for complete search history.

(56) References Cited

U.S. PATENT DOCUMENTS

| 5,948,040 | A | * | 9/1999 | DeLorme ............... G01C 21/36 340/990 |
| 6,198,431 | B1 | | 3/2001 | Gibson |
| 6,385,539 | B1 | | 5/2002 | Wilson et al. |
| 6,975,939 | B2 | | 12/2005 | Edwards et al. |
| 8,340,685 | B2 | | 12/2012 | Cochran et al. |
| 8,730,258 | B1 | | 5/2014 | Cornell |
| 8,958,979 | B1 | | 2/2015 | Levine et al. |
| 9,110,982 | B1 | | 8/2015 | Welsh et al. |

(Continued)

FOREIGN PATENT DOCUMENTS

| CN | 1624692 A | 6/2005 |
| CN | 102365637 A | 2/2012 |

(Continued)

OTHER PUBLICATIONS

Chen, et al., "Privacy-Preserving High-Quality Map Generation with Participatory Sensing", In Proceedings of 33rd Annual IEEE International Conference on Computer Communications, Apr. 27, 2014, pp. 1-9.

(Continued)

*Primary Examiner* — Sana A Al-Hashemi
(74) *Attorney, Agent, or Firm* — Schwegman Lundberg & Woessner, P.A.

(57) ABSTRACT

Systems, methods, and software are disclosed herein for enhancing entity classification operations for digital maps. In an implementation, an entity classification system associates tiles in a grid overlaying a map with discrete positioning records produced by devices operating in areas represented in the map. For each tile in an area of interest in the grid, the system produces a scalar description based on a subset of the discrete positioning records associated with the tile. The system then performs a binary classification of each tile as a type of entity (e.g. a road, business, or residence) based on the scalar description of the tile and the scalar descriptions of other tiles in the area of interest.

21 Claims, 6 Drawing Sheets

(56) References Cited

U.S. PATENT DOCUMENTS

| | | | | |
|---|---|---|---|---|
| 2013/0006925 | A1* | 1/2013 | Sawai | G06F 16/29 707/609 |
| 2013/0324098 | A1* | 12/2013 | Piemonte | H04M 1/72454 455/418 |
| 2014/0141803 | A1* | 5/2014 | Marti | G01S 5/0278 455/456.2 |
| 2015/0066359 | A1 | 3/2015 | Asai et al. | |
| 2015/0161439 | A1 | 6/2015 | Krumm et al. | |
| 2015/0187097 | A1 | 7/2015 | Savvopoulos | |
| 2015/0285654 | A1* | 10/2015 | Kogler | G01C 21/3635 701/409 |
| 2016/0342862 | A1* | 11/2016 | Liu | G06T 17/05 |
| 2017/0336215 | A1* | 11/2017 | Racz | G01C 21/32 |

FOREIGN PATENT DOCUMENTS

| | | |
|---|---|---|
| CN | 102436678 | 5/2012 |
| CN | 102183259 | 7/2014 |
| CN | 104807468 A | 7/2015 |
| WO | 2015150855 A1 | 10/2015 |

OTHER PUBLICATIONS

Hoh, et al., "Preserving Privacy in GPS Traces via Uncertainty-Aware Path Cloaking", In Proceedings of ACM Conference on Computer and Communications Security, Oct. 29, 2007, 11 pages.

Brüntrup, et al., "Incremental Map Generation with GPS Traces", In Proceedings of 8th International IEEE Conference on Intelligent Transportation Systems, Sep. 13, 2005, pp. 413-418.

Niehoefer, et al., "GPS Community Map Generation for Enhanced Routing Methods based on Trace-Collection by Mobile Phones", In Proceedings of 1st International Conference on Advances in Satellite and Space Communications, Jul. 2009, 6 pages.

Cao, et al., "From GPS Traces to a Routable Road Map", In Proceedings of 17th ACM SIGSPATIAL International Conference on Advances in Geographic Information Systems, Nov. 4, 2009, 10 pages.

Thiagarajan, et al., "Accurate, Low-Energy Trajectory Mapping for Mobile Devices", In Proceedings of 8th USENIX Symposium on Networked Systems Design and Implementation, Mar. 30, 2011, pp. 1-14.

Biagioni, et al., "Map Inference in the Face of Noise and Disparity", In Proceedings of 20th ACM SIGSPATIAL International Conference on Advances in Geographic Information Systems, Nov. 6, 2012, 10 pages.

Wang, et al., "CrowdAtlas: Self-Updating Maps for Cloud and Personal Use", In Proceedings of 11th Annual International Conference on Mobile Systems, Applications, and Service, Jun. 25, 2013, pp. 27-40.

Reddy, et al., "Biketastic: Sensing and Mapping for Better Biking", In Proceedings of 28th ACM Conference on Human Factors in Computing Systems, Apr. 10, 2010, 4 pages.

Kanhere, Salil S., "Participatory Sensing: Crowdsourcing Data from Mobile SmartPhones in Urban Spaces", In Proceedings of 12th IEEE International Conference on Mobile Data Management, Jun. 6, 2011, pp. 3-6.

Fathi, et al., "Detecting Road Intersections from GPS Traces", In Proceedings of the 6th International Conference on Geographic Information Science, Sep. 14, 2010, pp. 56-69.

Li, et al., "Mining Trajectory Data and Geotagged Data in Social Media for Road Map Inference: Mining Social Media for Road Map Inference", In Proceedings of the Transactions in Geographic Information System, vol. 19, Issue 1, Jan. 15, 2014,18 Pages.

"International Search Report and Written Opinion Issued in PCT Application No. PCT/US2017/032576", dated Jul. 4, 2017, 13 Pages.

Santos, et al., "Automatic Classification of Location Contexts with Decision Trees", In Proceedings of the Conference on Mobile and Ubiquitous Systems, Jun. 26, 2006, pp. 79-88.

Chen, et al., "Probabilistic Modeling of Traffic Lanes from GPS Traces", In Proceedings of the 18th SIGSPATIAL International Conference on Advances in Geographic Information Systems, Nov. 2, 2010, pp. 81-88.

"Office Action Issued in European Patent Application No. 17725827.4", dated Feb. 17, 2020, 5 Pages.

"Office Action Issued in Chinese Patent Application No. 201780030792.9", (w/ English Translation), dated Mar. 26, 2021, 17 pages.

"Notice of Allowance and Search Report Issued in Chinese Patent Application No. 201780030792.9", dated Aug. 18, 2021, 11 Pages.

Ahn, et al., "A Method of Digital Map Construction with Road Feature Extraction using 2-Dimensional Laser Range Finder", In Proceedings of 15th International Conference on Control, Automation and Systems, Oct. 13, 2015, pp. 509-512.

Kou, et al., "Recognition and Extraction of Road from Color Digital Raster Graphic", In Journal of Computer Engineering, vol. 38, Issue 13, Jul. 2012, pp. 276-279.

* cited by examiner

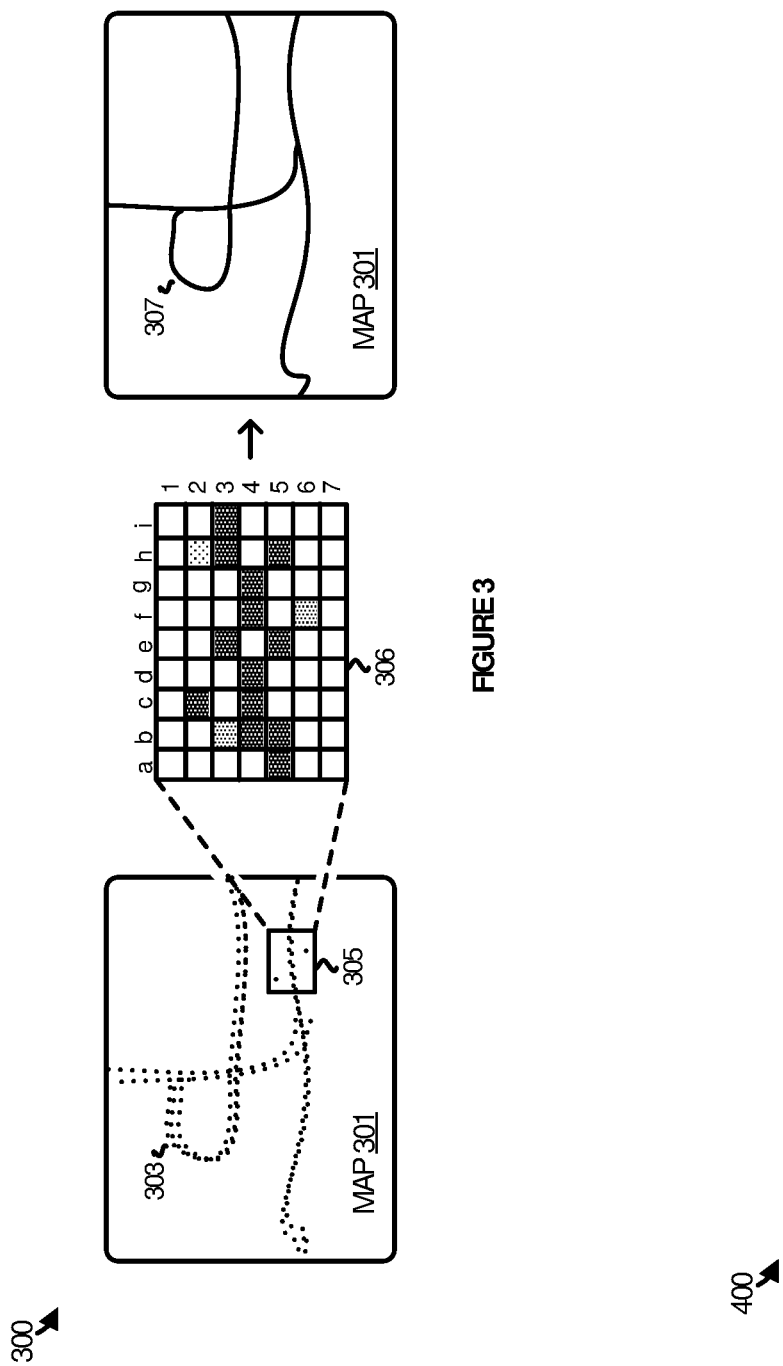

CLASSIFYING ENTITIES IN DIGITAL MAPS USING DISCRETE NON-TRACE POSITIONING DATA

TECHNICAL BACKGROUND

Digital maps have become indispensable tools of modern life that allow people to quickly and easily navigate to their destination, find places of interest, and otherwise explore their surroundings. While sometimes taken for granted, a great deal of advanced technology and manual effort are required to construct, curate, and maintain maps over time.

Specially equipped vehicles are utilized in some situations to travel the roads while recording street details. However, it is difficult to keep up with road changes just by driving every street, in addition to being a time consuming and expensive endeavor. Aerial imagery is utilized in other situations, but also has limits with respect to staying current and capturing the direction, speed, controls, and restrictions of a road.

Global Positioning System (GPS) traces have been used to overcome the challenges mentioned above, but come with limitations of their own. For example, multiple GPS points are needed to build a given trace, which limits the anonymity of such traces. The lack of anonymity influences users to limit their availability, which in turn reduces their effectiveness as a resource for inferring the presence roads and their details in a map.

OVERVIEW

Technology is disclosed herein that improves the creation, curating, and maintenance of digital maps. In an implementation, an entity classification system associates tiles in a grid overlaying a map with discrete positioning records produced by devices operating in areas represented in the map. For each tile in an area of interest in the grid, the system produces a scalar description based on a subset of the discrete positioning records associated with the tile. Then, the system performs a binary classification of each tile as a type of entity (e.g. a road, business, or residence) based on the scalar description of the tile and the scalar descriptions of other tiles in the area of interest.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates an operational scenario in an implementation.

FIG. 4 illustrates a discretized record in an implementation.

TECHNICAL DISCLOSURE

Figure 1:
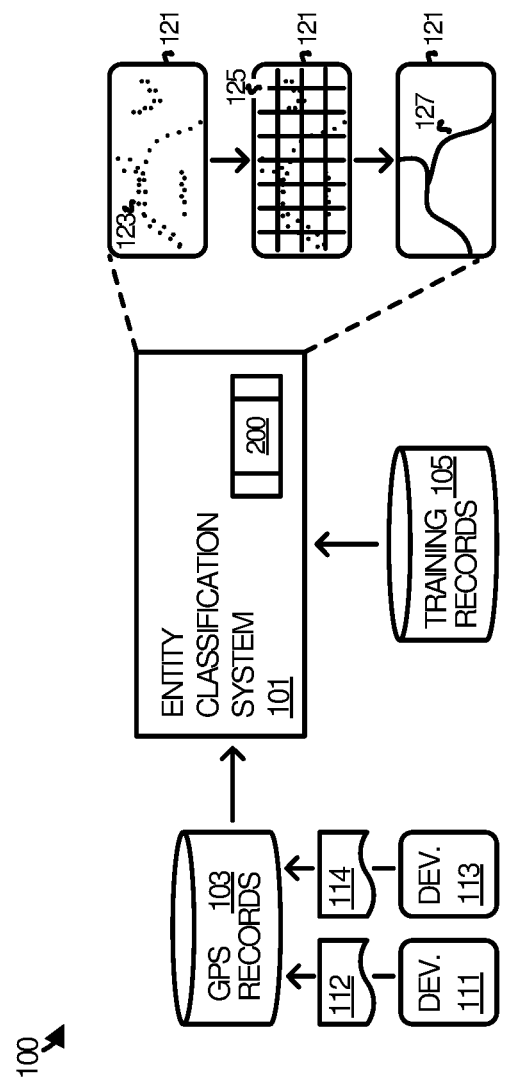
FIG. 1 illustrates an operational architecture in an implementation of enhanced classification technology for digital maps.

Classification technology is disclosed herein that allows entities in digital maps, such as roads, business, and residences, to be identified from discrete positioning data. In some examples, the data include anonymous, non-trace Global Positioning Satellite (GPS) data collected from devices operating in areas represented in the maps. WiFi data, cellular information, and other such data may also be utilized in some examples. The devices may include, for example, mobile phones, dedicated location devices, equipment embedded in automobiles, or any other device capable of reporting positioning data.

An entity classification system utilizes a tile-based approach to identify entities in the maps, such as roads, businesses, and residences. The tile-based approach considers a map in terms of a grid on the map, defined in terms of longitude and latitude. The discrete positioning data may be plotted on the map such that each data point can be represented visually within a given tile. The tile-based approach then calls for analyzing a scalar description of each tile that is produced from the discrete positioning data associated with each tile. The scalar description of other tiles associated with a given tile are also considered in the analysis.

A binary classification is then performed for each tile based on the scalar descriptions of the tile and the other tiles associated with it. For instance, the entity classification system classifies a tile as belonging to a road (or not), a business (or not), or a residence (or not). A second layer of classification may also be performed to determine sub-characteristics of a given tile. Other characteristics of a tile that it may be possible to classify include the geometry and connectivity of roads, the direction of travel, speed limits, turn restrictions, traffic patterns, elevations, and the popularity of prominence of places.

In some implementations, the scalar description of a tile is a feature vector that is provided as input to a classifier model. The classifier model may be trained using machine learning techniques to recognize a road, a business, a residence, or the like. The feature vector itself may be generated from features derived from the discrete positioning data associated with a given tile. For example, the features may indicate various statistics on a given tile, such as the quantity of positioning records per tile, the average speed reported for each tile, the variance of speed, a mean heading, and a variance of heading for a tile. It may be appreciated that a feature in the context of machine learning technology is an individual measurable property of a phenomenon being observed, the aforementioned statistics being exemplary of such features.

The feature vectors may also be utilized in the context of anomaly detection to discover changes in maps after they have been classified. For instance, the feature vectors may be input to an anomaly detection algorithm to detect road closures, land closures, unusual traffic patterns, new businesses, business closures, and trending places. In one scenario, new data is aggregated in and compared to a historical model of a given area at various resolutions (venue size, neighborhood size, city size, etc.). Areas with the greatest differences between the historical model and the new data are identified using any of a variety of anomaly detection techniques, such as Cosine similarity, Jaccard similarity, and Gaussian discriminate analysis. The areas that differ greater than a threshold amount are flagged for new classification analysis.

In the aggregate, the classification of tiles using the tile-based approach described above allows roads and other map entities to be discovered from discrete, anonymous positioning data. Various technical effects of the technology is the reduction of manual effort that is otherwise required by prior art classification processes. Non-trace data is effectively anonymous and is easier to process relative to trace data because the non-trace data can be treated independently. In addition, new roads, changes in roads, and other physical variations that arise in areas covered by a map can be discovered and mapped more easily, without requiring physical roads to be driven or aerial photographs to be taken, both of which are resource intensive endeavors.

Figure 7:
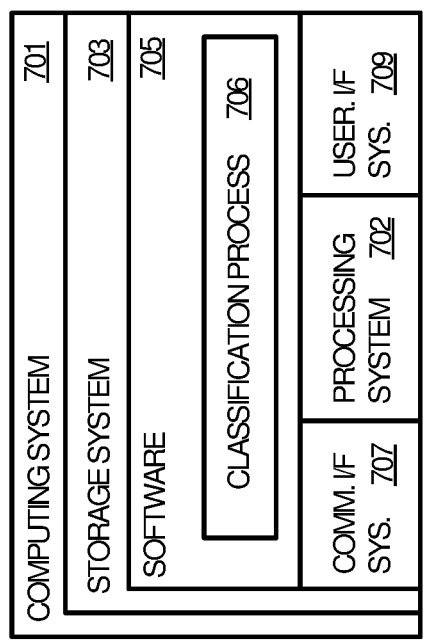
FIG. 7 illustrates a computing system suitable for implementing the enhanced classification technology disclosed herein for digital maps, including any of the applications, architectures, elements, processes, and operational scenarios and sequences illustrated in the Figures and discussed below in the Technical Disclosure.

FIG. 1 illustrates an operational architecture 100 in an implementation of enhanced classification technology. Operational architecture 100 includes entity classification system 101, which employs classification process 200 in the context of classifying entities in digital maps. GPS records 103 are provided as input to entity classification system 101, as are training records 105. Entity classification system 101 outputs a map 121 that has been updated via classification process 200. Entity classification system 101 and classification process 200 may be implemented using any suitable computing system or systems (physical and/or virtual), of which computing system 701 in FIG. 7 is representative.

GPS records 103 are representative of discrete positioning records that may be reported by mobile phones, global positioning devices, embedded automobile equipment, or any other suitable devices capable of reporting such information. Device 111 and device 113, and record 112 and record 114, are representative of such devices and records respectively.

Figure 2:
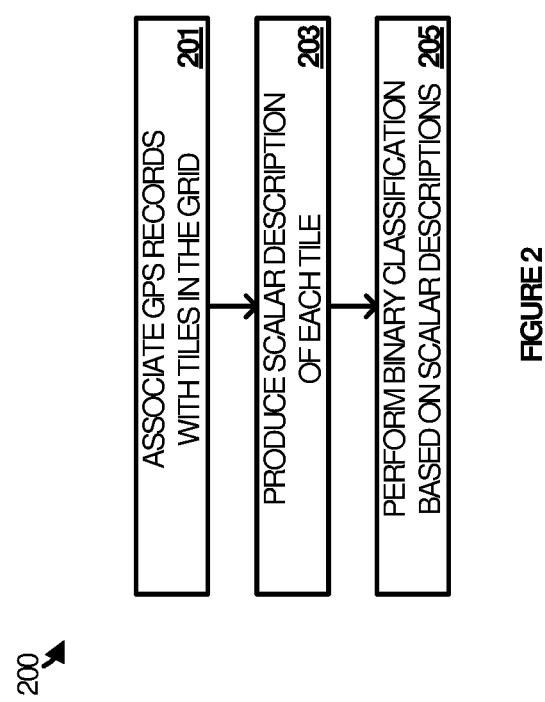
FIG. 2 illustrates a classification process in an implementation.

Referring parenthetically to the steps in FIG. 2, in operation entity classification system 101 associates GPS records with the tiles in a grid 125 overlaid with respect to a map being updated, produced from scratch, or otherwise processed (step 201). The GPS records may be visualized as points 123 on the map 121.

The number of records associated with a given tile may vary, as well as the size of the tile itself. For example, the number of records could be varied by changing the size of the historical window for positioning data for a given tile. A one-month window would result in one set of data, while a three-month window would result in more data, and so on. How far back to include positioning data could be varied based on a desired level of precision, a desired level of speed, or some other configurable setting.

The size of an area on the ground corresponding to a tile can also be varied and may depend on the granularity of a map. For example, a tile could be set to correspond to a 3-meter by 3-meter area on the ground. Adjusting the tile-to-ground correspondence could be performed to increase precision, increase speed, or achieve some other performance goal.

Next, entity classification system 101 produces a scalar description of each tile in the map 121 from the GPS records associated with each tile (step 203). The scalar description may include, for example, the quantity of records associated with a tile, the average position of the tiles, the average speed of the tiles, the average heading, and the average accuracy.

Entity classification system 101 then performs a binary classification of a tile as a road or some other type of entity using the scalar description of the tile and the scalar description of other tiles as input (Step 205). In a brief example, the scalar description of the tile and that of the other tiles may be compared to scalar descriptions of labeled tiles for which an entity classification is already know.

FIG. 3 illustrates an operational scenario 300 in another example of the features and functionality of an entity classification system. In operational scenario 300, a map 301 includes a visualization 303 of a set of discrete positioning points. The points may be derived from anonymous, non-trace GPS records and are plotted in the map 301 per their latitude and longitude.

An area of interest 305 may be selected in the map 301 for classification analysis. A zoomed-in view 306 of the area of interest 305 includes a grid overlaid with respect to the area of interest. The grid includes tiles defined in terms of a-i on the x-axis and 1-7 on the y-axis. The entity classification system produces a scalar description of each tile in the area of interest 305. The difference in the scalar descriptions is represented visually by different fill patterns in the tiles.

Each tile may be classified based on its scalar description and at least one other scalar description for at least one other tile. In this example, the other tiles surrounding a given tile may be used to classify the tile. For instance, if tile f4 is being classified, then its scalar description and the scalar descriptions for tiles e3-5, f3, f5, and g3-5 would be considered. If tile e3 is being classified, then its scalar description and the scalar descriptions for tiles d2-4, e2, e4, and f2-f4 would service as input to the classifier.

Once the entities in a map have been identified and/or updated, a visualization of the entities can be produced. In this simplified example, visualization 307 represents the roads that may have been identified by the entity classification system from the anonymous, non-trace GPS data. It may be appreciated that the data points in tiles c2 and f6 were not classified as roads and, as such, no road is present in that space in visualization 307.

FIG. 4 illustrates a GPS record 400 that could service as the basis for producing scalar descriptions of tiles. GPS record 400 indicates positioning information, such as time, latitude and longitude, X and Y coordinates, altitude, speed, heading, and accuracy, among other information. Such information can be aggregated for each tile in a map and processed to produce the scalar description of the tile. For instance, tens, hundreds, thousands, or even more individual records could be associated with a given tile. The scalar description of the tile may then be derived from an analysis of all of the records for the tile. Average speed, averaged heading, variances, and other information could be calculated from all of the tiles and used to describe the tile.

In some implementations, the scalar description for a tile is a feature vector and each value in the feature vector may be considered a feature of the tile. The feature vector may then serve as input to a classifier(s) engine that is capable of ascertaining whether or not the tile is part of a road, a business, a residence, or some other type of map entity.

Machine learning techniques may be employed to train the classifier engine, using mapping information for which the entities in a map are known. A machine algorithm(s)

produces a model or models from the training data that may then be applied to classify (or re-classify) entities in maps.

Figure 5:
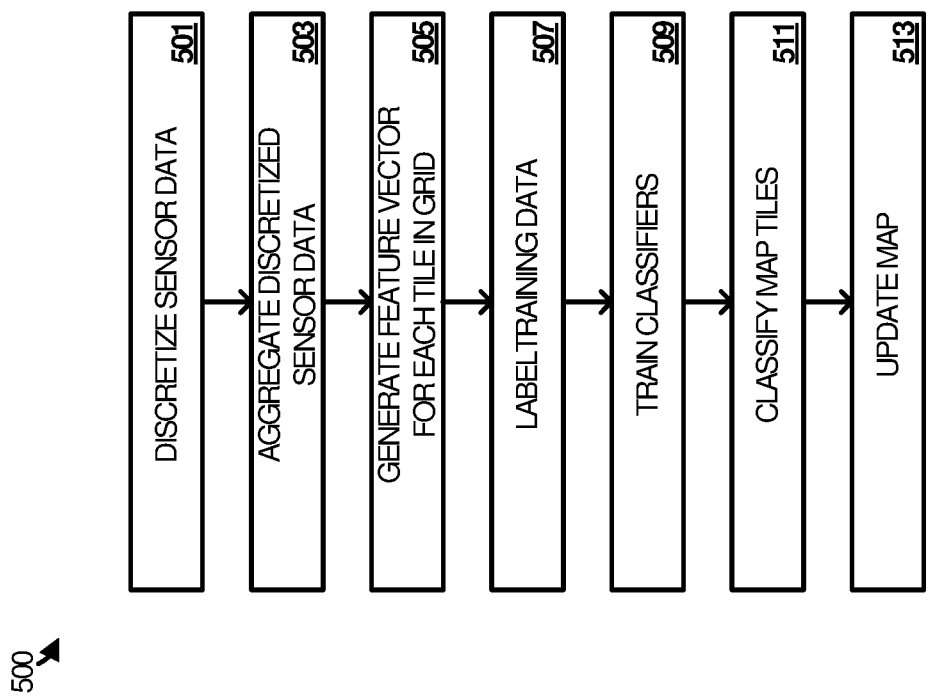
FIG. 5 illustrates another classification process in an implementation.

FIG. 5 illustrates a classification process 500 that may be employed by an entity classification system in an implementation. The entity classification system first discretizes sensor data (step 501). The sensor data is then aggregated (step 503), meaning that individual data points may be associated with a specific tile in a map. Each tile in a grid defining a map will thus have a set of discrete positioning records of points associated with it. Features are calculated from the sensor data for each tile and are used to construct the feature vectors that service as input to classifier models (step 505).

In the meantime, training data is labeled (step 507) and used to train the classifier models (step 509). For instance, feature vectors are produced for tiles for which the entity type of the tile is known. The known feature vectors then become part of a model that is used to evaluated unknown tiles. The unknown tiles are thus classified (511) by a classification engine in view of the classification models built from the training data (513). The newly-identified tiles may also serve as training data in some implementation.

Once the tiles in an area of interest have been classified, a map or maps may be updated to reflect the type of each of the tiles. For instance, a tile may be classified as a road and its description updated in a mapping database. Eventually, the updated map is used by people on the ground to navigate, find places of interest, and so on.

Figure 6:
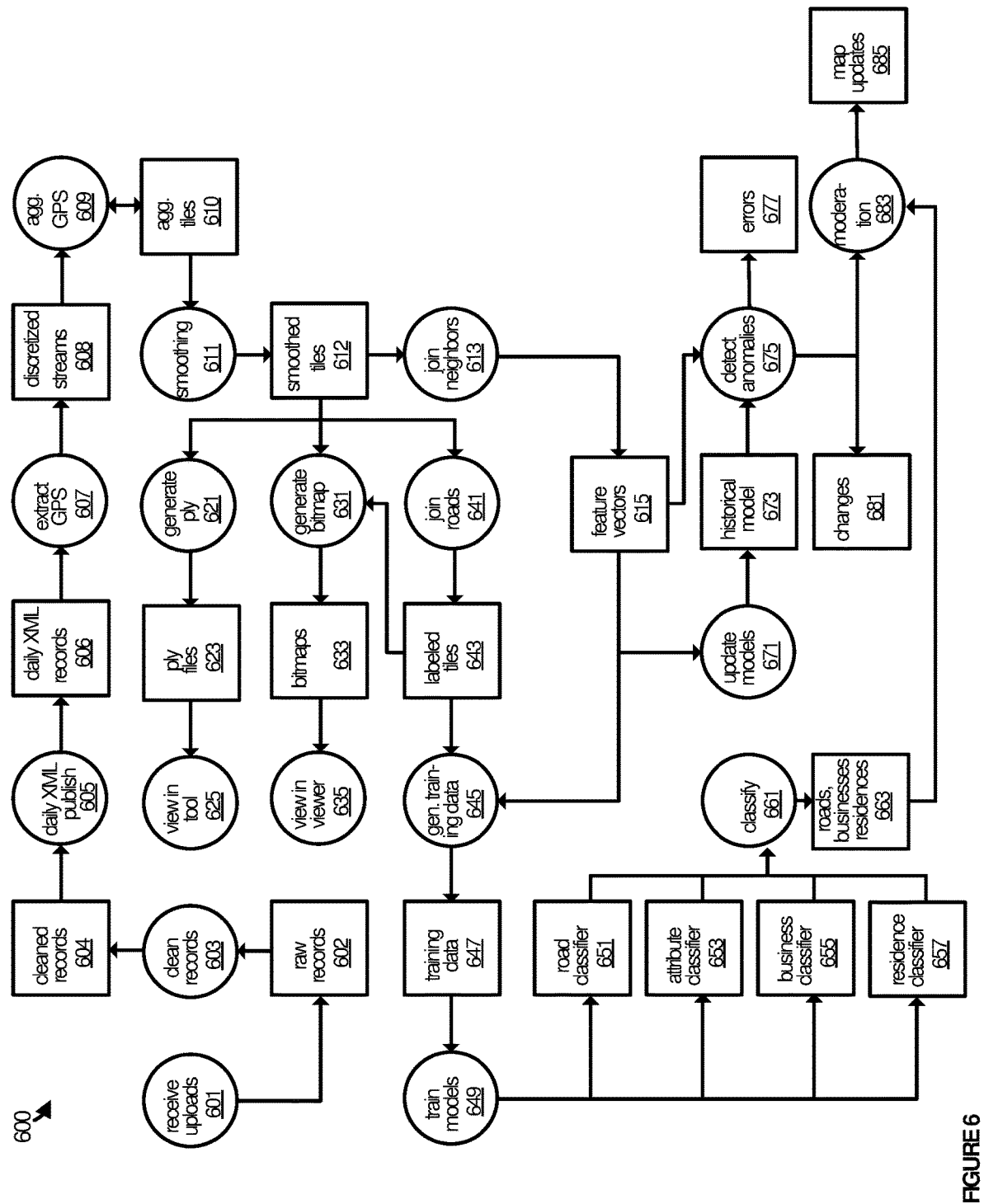
FIG. 6 illustrates another classification process in an implementation.

FIG. 6 illustrates another classification process 600 in an implementation. In operation, an entity classification system receives uploads of raw records 602. The raw records may be, for example, anonymous, non-trace GPS data produced over time by GPS devices deployed in smart phones, personal GPS devices, cars, and the like.

The raw records 602 are cleaned (step 603) to produce clean records 604, which are then published daily in XML (step 605). The daily XML records 606 are provided as input to a GPS extraction function (step 607), which extracts specific pieces of data from the daily XML records 606 to produce discretized streams of data 608. Other protocols in place of or in addition to XML may be used.

The discretized streams of data are aggregated (step 609) on a per-tile basis with respect to the map or maps that cover the areas specific to a given record. Aggregated tiles 610 are produced in this step, which provide the input to a smoothing step (step 611). The smoothing produces smoothed tiles 612, which are the input to several next steps.

In one path, neighbor tiles are joined to each other (step 613) and feature vectors 615 are produced. The feature vectors 615 are input to a training step and an anomaly detection step.

Referring back to the smoothed tiles 612, they are used to generate *.ply files (step 621). The *.ply files 623 are provided as input to be viewed in a polygon viewer. The smoothed tiles 612 are also processed to generate a bitmap (step 631). The bitmaps 633 can be viewed in a bitmap viewer (step 635). These steps are optional and may be useful for demonstration and debugging purposes.

In some implementations, the smoothed tiles 612 are also used to join roads (step 641), in which case the smoothed tiles 612 become labeled tiles 643. The labeled tiles 643 are processed to produced training data (step 645). Training data 647 is submitted as input to machine learning systems to train classifier models (step 649).

The classifier models may include a road classifier 651, an attribute classifier 653, a business classifier 655, and a residence classifier 657. Other classifiers in addition to or in place of those included herein are possible. The classifiers are applied to the data to classify the entities within a map as a road, attribute, business, or residence, for example (step 661). The classifications 663 are then used to produce map updates 685.

In addition to being provided as input to classify entities, the feature vectors 615 are also provided as input update the classifier models (step 671) and as input to detect anomalies (step 675). The historical models 673 can be processed against the feature vectors 615 to detect changes 681 over time and to detect errors 677. Anomaly detection can be provided as input to a moderation process 683 that may provide a moderating influence on the map updates 685 driven by the classifications 663.

FIG. 7 illustrates computing system 701, which is representative of any system or collection of systems in which the various applications, services, scenarios, and processes disclosed herein may be implemented. Examples of computing system 701 include, but are not limited to, server computers, rack servers, desktop computers, or any other type of computing system suitable for carrying out the classification operations described herein. Such systems may employ one or more virtual machines, containers, or any other type of virtual computing resource in the context of classifying map entities.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes classification process 706 which is representative of the processes discussed with respect to the preceding FIGS. 1-6, including classification processes 200, 500, and 600. When executed by processing system 702 to enhance classification operations, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing enhanced entity classification for digital maps.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include classification process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to enhance entity classification operations. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Certain inventive aspects may be appreciated from the foregoing disclosure, of which the following are various examples.

EXAMPLE 1

A method for automatically identifying roads in digital maps comprising: associating tiles in a grid overlaying a map with discrete positioning records produced by mobile devices operating in areas represented in the map; producing a scalar description of each tile in an area of interest in the grid based on a subset of the discrete positioning records associated with the tile; and for each of the tiles in the area of interest, performing a binary classification of the tile as a road based at least in part on the scalar description produced for the tile and other scalar descriptions produced for other tiles in the area of interest.

EXAMPLE 2

The method of Example 1 wherein the scalar description of each of the tiles in the area of interest comprises a feature vector having features and wherein producing the scalar description comprises: deriving the features from data included in the discrete positioning records; and constructing the feature vector from the features.

EXAMPLE 3

The method of Examples 1-2 wherein performing the binary classification of the tile comprises submitting the feature vector for the tile and other feature vectors for the other tiles as input to a binary classifier.

EXAMPLE 4

The method of Examples 1-3 wherein the other tiles comprise a subset of the tiles in the area that surround the tile in the grid.

EXAMPLE 5

The method of Examples 1-4 wherein the scalar description for the tile comprises statistics on the subset of the discrete positioning records associated with the tile.

EXAMPLE 6

The method of Examples 1-5 wherein the statistics comprise a quantity of records, a mean speed, a variance of speed, a mean heading, and a variance of heading.

EXAMPLE 7

The method of Examples 1-6 wherein the discrete positioning records comprise non-trace Global Positioning System (GPS) records.

EXAMPLE 8

A computing apparatus comprising: one or more computer readable storage media; a processing system operatively coupled with the one or more computer readable storage media; and program instructions stored on the one or more computer readable storage media for automatically identifying roads in digital maps that, when executed by the processing system, direct the processing system to at least: associate tiles in a grid overlaying a map with discrete positioning records produced by mobile devices operating in areas represented in the map; produce a scalar description of each tile in an area of interest in the grid based on a subset of the discrete positioning records associated with the tile; and for each of the tiles in the area of interest, perform a binary classification of the tile as a road based at least in part on the scalar description produced for the tile and other scalar descriptions produced for other tiles in the area of interest.

EXAMPLE 9

The computing apparatus of Example 8 wherein the scalar description of each of the tiles in the area of interest comprises a feature vector having features and wherein, to produce the scalar description, the program instructions direct the processing system to: derive the features from data included in the discrete positioning records; and construct the feature vector from the features.

EXAMPLE 10

The computing apparatus of Examples 8-9 wherein, to perform the binary classification of the tile, the program instructions direct the processing system to submit the feature vector for the tile and other feature vectors for the other tiles as input to a binary classifier.

EXAMPLE 11

The computing apparatus of Examples 8-10 wherein the other tiles comprise a subset of the tiles in the area that surround the tile in the grid.

EXAMPLE 12

The computing apparatus of Examples 8-11 wherein the scalar description for the tile comprises statistics on the subset of the discrete positioning records associated with the tile.

EXAMPLE 13

The computing apparatus of Examples 8-12 wherein the statistics comprise a quantity of records, a mean speed, a variance of speed, a mean heading, and a variance of heading.

EXAMPLE 14

The computing apparatus of Examples 8-13 wherein the discrete positioning records comprise non-trace Global Positioning System (GPS) records.

EXAMPLE 15

A method for automatically identifying map features in digital maps comprising: associating tiles in a grid overlaying a map with discrete positioning records produced by mobile devices operating in areas represented in the map; producing a scalar description of each tile in an area of interest in the grid based on a subset of the discrete positioning records associated with the tile; and for each of the tiles in the area of interest, classifying the tile as a one of a plurality of possible map features based at least in part on the scalar description produced for the tile and other scalar descriptions produced for other tiles in the area of interest.

EXAMPLE 16

The method of Example 15 wherein the scalar description of each of the tiles in the area of interest comprises a feature vector having features and wherein producing the scalar description comprises: deriving the features from data included in the discrete positioning records; and constructing the feature vector from the features.

EXAMPLE 17

The method of Examples 15-16 wherein the plurality of possible map features comprises a road, a business, and a residence.

EXAMPLE 18

The method of Examples 15-17 wherein the scalar description for the tile comprises statistics on the subset of the discrete positioning records associated with the tile.

EXAMPLE 19

The method of Examples 15-18 wherein the statistics comprise a quantity of records, a mean speed, a variance of speed, a mean heading, and a variance of heading.

EXAMPLE 20

The method of Examples 15-19 wherein the discrete positioning records comprise non-trace Global Positioning System (GPS) records.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method, performed by a processor of a classification system, for automatically identifying roads in digital maps comprising:
receiving, from mobile devices, discrete positioning records to be stored in a database;
associating the discrete positioning records, obtained from the database, produced by the mobile devices, with tiles in a grid, including associating at least one discrete positioning record produced by a first mobile device of the mobile devices and at least one discrete positioning record produced by a second mobile device of the mobile devices;
producing, for at least an area of interest in the grid, feature vectors for each tile of the tiles in the area of interest based on a subset of the discrete positioning records, the subset including the at least one discrete positioning record produced by the first mobile device and the at least one discrete positioning record produced by the second mobile device;
for a tile of the tiles in the area of interest, performing a binary classification of the tile as a road based at least in part on a feature vector produced for the tile and other feature vectors produced for other tiles in the area of interest; and
generating a map update based on the binary classification indicating that the tile is a road.

2. The method of claim 1 wherein producing the feature vectors comprises:
deriving features from data included in the discrete positioning records; and
constructing the feature vector from the features.

3. The method of claim 1 further comprising submitting the feature vectors as an input to an anomaly detection classifier that processes a historical model of the area of interest and the feature vectors to detect changes in patterns of the tiles.

4. The method of claim 1 wherein the other tiles comprise a subset of the tiles in the area of interest that surround the tile in the grid.

5. The method of claim 4 wherein the feature vector for the tile comprises statistics on the subset of the discrete positioning records.

6. The method of claim 5 wherein the statistics comprise a quantity of records, a mean speed, a variance of speed, a mean heading, a variance of heading, and a covariance of each of the statistics.

7. The method of claim 6 wherein the discrete positioning records comprise non-trace Global Positioning System (GPS) records.

8. A computing apparatus comprising:
one or more computer readable storage media;
a processing system of a classification system operatively coupled with the one or more computer readable storage media; and
program instructions stored on the one or more computer readable storage media for automatically identifying roads in digital maps that, when executed by the processing system, direct the processing system to at least:
receive, from mobile devices, discrete positioning records to be stored in a database;
associate the discrete positioning records, obtained from the database, produced by the mobile devices, with tiles in a grid, including associating at least one discrete positioning record produced by a first mobile device of the mobile devices and at least one discrete positioning record produced by a second mobile device of the mobile devices;
produce, for at least an area of interest in the grid, feature vectors for each tile of the tiles in the area of interest based on a subset of the discrete positioning records, the subset including the at least one discrete positioning record produced by the first mobile device and the at least one discrete positioning record produced by the second mobile device;
for a tile of the tiles in the area of interest, perform a binary classification of the tile as a road based at least in part on a feature vector produced for the tile and other feature vectors produced for other tiles in the area of interest; and generate a map update based on the binary classification indicating that the tile is a road.

9. The computing apparatus of claim 8 wherein, to produce the feature vectors, the program instructions direct the processing system to:
derive features from data included in the discrete positioning records; and construct the feature vector from the features.

10. The computing apparatus of claim 9 wherein the program instructions direct the processing system to submit the feature vectors as an input to an anomaly detection classifier.

11. The computing apparatus of claim 8 wherein the other tiles comprise a subset of the tiles in the area of interest that surround the tile in the grid.

12. The computing apparatus of claim 11 wherein the feature vector for the tile comprises statistics on the subset of the discrete positioning records.

13. The computing apparatus of claim 12 wherein the statistics comprise a quantity of records, a mean speed, a variance of speed, a mean heading, and a variance of heading.

14. The computing apparatus of claim 13 wherein the discrete positioning records comprise non-trace Global Positioning System (GPS) records.

15. A method for automatically identifying map features in digital maps comprising:
via one or more processors of a classification system:
receiving, from mobile devices, discrete positioning records to be stored in a database;
associating the discrete positioning records, obtained from the database, produced by the mobile devices, with tiles in a grid, including associating at least one discrete positioning record produced by a first mobile device of the mobile devices and at least one discrete positioning record produced by a second mobile device of the mobile devices;
producing, for at least an area of the interest in the grid, feature vectors for each tile of the tiles in the area of interest based on a subset of the discrete positioning records, the subset including the at least one discrete positioning record produced by the first mobile device and the at least one discrete positioning record produced by the second mobile device;
for a tile of the tiles in the area of interest, classifying the tile as one of a plurality of possible map features based at least in part on a feature vector produced for the tile and other feature vectors produced for other tiles in the area of interest; and
generating a map update based on the binary classification indicating that the tile is one of the plurality of possible map features.

16. The method of claim 15 wherein producing the feature vectors comprises:
deriving features from data included in the discrete positioning records; and
constructing the feature vector from the features.

17. The method of claim 15 wherein the plurality of possible map features comprises a road, a business, and a residence.

18. The method of claim 17 wherein the feature vector for the tile comprises statistics on the subset of the discrete positioning records.

19. The method of claim 18 wherein the statistics comprise a quantity of records, a mean speed, a variance of speed, a mean heading, and a variance of heading.

20. The method of claim 15 wherein the discrete positioning records comprise non-trace Global Positioning System (GPS) records.

21. The method of claim 1, wherein the feature vector is a set of numerical descriptors that represent the tile.

* * * * *